3,776,904
5-NITROFURFURYLIDENALKYL DERIVATIVES, PROCESS FOR THEIR MANUFACTURE AND THEIR USE AS FEEDSTUFF ADDITIVES
Henry Martin and Stefan Janiak, Basel, Switzerland, Georg Pissiotas, Lorrach, Germany, and Otto Rohr, Therwil, Switzerland, assignors to Ciba-Geigy AG, Basel, Switzerland
No Drawing. Continuation-in-part of abandoned application Ser. No. 15,936, Mar. 2, 1970. This application Oct. 4, 1971, Ser. No. 186,486
Claims priority, application Switzerland, Mar. 4, 1969, 3,273/69
Int. Cl. C07d 33/52
U.S. Cl. 260—240 A   4 Claims

ABSTRACT OF THE DISCLOSURE

New 5-nitrofurfurylidenalkyl compounds substituted by a nitrogen containing heterocycle are disclosed. They are useful as feedstuffs and feedstuff additives for farm animals. They have antiparasitic, antibacterial and growth stimulating properties.

CROSS REFERENCE

This application is a continuation in part application of application Ser. No. 15,936 filed Mar. 2, 1970, now abandoned.

DESCRIPTION OF THE INVENTION

This invention relates to 5-nitrofurfurylidenalkyl derivatives which are especially useful as feedstuffs and feedstuff additives for farm animals.

Compounds of the formula

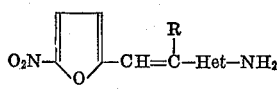

in which Het represents a heterocyclic radical and R represents a hydrogen atom or a lower alkyl radical are known to possess antibacterial and antiparasitic acid (compare, for example, Belgian patent specifications Nos. 638,220 and 638,221; also French patent specification No. 1,359,503, Belgian patent specifications Nos. 630,163 and 639,955, Japanese patent publications Nos. 13,740/64, 19,452/64, 19,643/64, 19,653/64, 19,654/64 and 21,527/64, as well as J. Pharm. Soc. Japan 81, 1357 (1961); 83, 771, 778 and 1129 (1963)).

The present invention provides compounds of the general formula

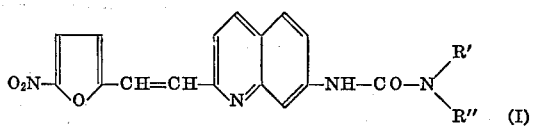

in which R′ and R″ may be the same or different and each represents a hydrogen atom or an alkyl radical with up to 12 carbon atoms, preferably a lower alkyl radical with 1 to 5 carbon atoms, a chloroalkyl radical with 1 to 3 carbon atoms or an alkenyl radical with 2 to 4 carbon atoms.

Examples of such radicals are: methyl, ethyl, n-propyl, isopropyl, n-, iso-, sec.-, tert.-butyl, amyl, octyl, dodecyl, β-chloroethyl, allyl, methallyl, methylpropenyl.

The compounds of the present invention possess valuable antiparasitic and antibacterial properties both in vitro and in vivo, and are very effective for stiumulating the growth of warm-blooded animals, for example poultry, cattle, sheep, pigs and other farm animals. They are active in infected animals, for example in mice, against gram-negative and gram-positive bacteria, for example *Salmonella typhi*, for example, *Salmonella typhi murium*, coli bacilli, for example, *E. coli*, Staphyloccocci, for example, *Staph. aureus*, and *Pateurella avicida*. Furthermore, as is, for example, found in experiments on hamsters, the new compounds are active against amoebae and also, for example, in mice and sheep, against schistosomes. The new compounds can therefore be used as active substances in feedstuff and in antiparasitic and antibacterial agents. They are especially suitable for the treatment of the illnesses caused by the above excitants.

An especially valuable compound is the compound of the formula

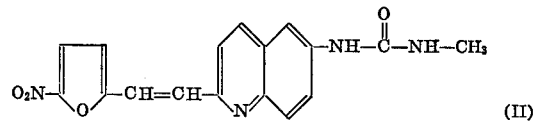

The compounds of the present invention may be prepared by either
(a) reacting the compound of the formula

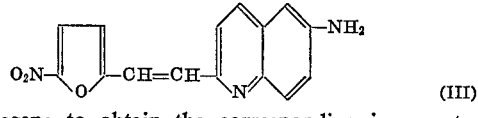

with phosgene to obtain the corresponding isocyanate, which can then be further reacted with an amine of the formula

wherein R′ and R″ have the meansings given above.

If at least one of the substituents R′ and R″ represents hydrogen it is also possible to react an amine of the Formula III with an isocyanate of the formula $$O=C=N-R''$$ (V)

wherein R″ has the meaning given for Formula I.

It is also possible to react an amine of the Formula III with an aliphatic, aromatic or araliphatic chlorocarbonic acid ester and to use the resulting carbamate for further reacting with an amine of the Formula IV to obtain the corresponding urea.

Similarly, it is possible to react the amine of Formula III with a carbamic acid halide to obtain a corresponding urea.

The compounds of the present invention may also be prepared by
(b) nitrating a compound of the formula

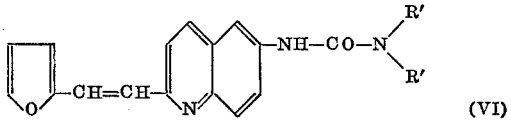

in which R′ and R″ have the meanings specified above, in the 5-position of the furfurylidene radical.

The starting substances used in the process of the present invention are known or can be obtained according to methods which are in themselves known.

The compounds of the present invention can be used in their free form or in the form of their salts, together with pharmaceutical, organic or inorganic, solid or liquid carriers which are suitable for enteral, for example, oral, parenteral or topical, administration.

Thus, the present invention also provides a pharmaceutical preparation, which comprises, as active ingredient, a compound of the general Formula I in admixture or conjunction with a pharmaceutically suitable carrier.

As carriers there may be used those substances which do not react with the compounds of the present invention, for example water, gelatine, lactose, starch, magnesium stearate, talc, vegetable oils, benzyl alcohols, gum, polyalkylene glycols white petroleum jelly, cholesterol or other medicinal carriers. The pharmaceutical preparations can for example, be in the form of tablets, dragées, capsules, creams or ointments, or in a liquid form as solutions, suspensions or emulsions. The creams or ointments can, for example, contain from 0.1 to 2%, preferably from 0.25 to 1%, of the active substance. They may be sterilised and/or contain auxiliary substances, for example preservatives, stabilisers, wetting agents or emulsifiers, salts for regulating the osmotic pressure or buffers. They can also contain further therapeutically valuable substances. The active compounds can also be used as a disinfectant in the usual manner, for example together with the usual carriers.

The present invention also provides feedstuffs or feedstuff additives for farm animals, which comprise, as active ingredient, a compound of Formula I.

The feedstuffs according to the present invention contain from about 2 to 200 grams, preferably from 5 to 100 grams of active substance per ton. The content of the active compounds in feedstuff additives can be varied within wide limits. Apart from the above-mentioned active compounds, poultry feedstuffs may contain the usual constituents, for example grain, protein additives, mineral salts, green fodder, vitamin additives, antimicrobial agents, especially antibiotics and other substances, in the quantity ratios known to be an optimum for the individual feedstuffs. Examples of suitable feedstuff constituents are: barley, barley flour, buckwheat, maize, maize flour, durra, oats, groats, oatmeal, flaked oats, rye, wheat, wheat gluten, scrap wheat, milk, bonemeal, meat meal, scrap meat, maize gluten meal, oilcake meal, soya bean meal, whey residues, fishmeal, distillation residues from the manufacture of alcohol, lucerne, dried lucerne meal, clover, grass, cabbage, savoy cabbage, liver oil and similar nutrients, mineral additives such as dicalcium phosphate, calcium carbonate, iodised salt, manganese sulphate, zinc salts, cobalt salts, iron salts or copper salts, vitamins, for example, vitamin A, niacin, calcium panthothenate, thiamine, riboflavin, vitamin $B_{12}$, ascorbic acid, vitamin D or vitamin E, other essential additives, for example, butyloxytoluene or methionine, and antimicrobial agents, especially antibiotics, for example, bacitracin, penicillin, tetracyclin, chlorotetracyclin, oxytetracyclin or erythromycin.

Preferably, a premix is prepared which contains the active substance together with a suitable carrier. Suitable carriers are, for example scrap wheat, starch, cane sugar, lactose, mannitol, sodium gluconate, soya bean feedstuff extracted with solvents, or other suitable mixing agents; other additives, for example, buffers or buffer systems, for example, citric acid-sodium citrate, sodium acetate, dipotassium phtalate-phthalic acid, sodium benzoate-benzoic acid, sodium lactate-lactic acid or sodium fumarate-fumaric acid, wetting agents, for example, salts of ethylene-diamine-tetraacetic acid, for example, the tetrasodium salt of ethylenediamine-tetraacetic acid, which can also contain monosodium salts of N,N-bis-(2-hydroxyethyl)-glycine, or other suitable agents, for example, antioxydants or stabilisers. The premix contains from about 0.1 to about 20%, preferably from 0.5 to about 10%, of the active substance together with a suitable mixture of carriers and auxiliary substances.

These feedstuffs may be manufactured according to methods which are in themselves known, by adding the premix to the feedstuff in such amounts that the desired concentrations of the active constituent are achieved in the end product. The active compounds can however also be administered in solution or dispersion, for example with drinking water or in any other desired form.

The following examples illustrate the invention.

Example 1

28.1 g. (=0.1 mole) of 2-(5-nitrofurfurylidenemethyl)-6-aminoquinoline and 150 ml. of dimethylformamide were introduced into a reaction flask. 7 g. (=0.11 mole) of methylisocyanate in 50 ml. of dimethylformamide were added dropwise at room temperature. The reaction mixture was thoroughly stirred overnight and then heated for one hour to 50° C. After cooling to room temperature the end product was precipitated by adding 150 ml. of methanol. The suspension obtained was then stirred for one hour, the residue was sucked off and washed with methanol. After drying in vacuo at 70° C. the crude product (27 g.) was heated in 150 ml. of ethanol, sucked off at 30° C. and dried again in vacuo at 70° C.

The compound of the formula

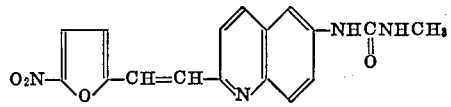

[Compd. No. 1]

was obtained in a yield of 25.4 g. (=75.1% of the theoretical yield), M.P. 260° C.

The following compounds of the Formula I were prepared in a similar manner:

| Number | R' | R'' | M.P. [° C.] (decomposition) |
|---|---|---|---|
| 2 | H | Ethyl | 230 |
| 3 | H | Isopropyl | 239 |
| 4 | H | n-Butyl | 238–240 |
| 5 | H | Allyl | 241–243 |
| 6 | Methyl | Methyl | 225 |
| 7 | Ethyl | Ethyl | >230 |
| 8 | H | β-Chlorethyl | 205–207 |
| 9 | H | n-Amyl | >240 |
| 10 | H | n-Octyl | 245–253 |
| 11 | H | n-Dodecyl | 260 |

Example 2

Manufacture of poultry feedstuff from the following constituents:

MAIN CONSTITUENTS (PREMIX)

|  | G. |
|---|---|
| N-[2-(5-nitrofurfurylidenemethyl)-6-quinolyl]-N',N'-dimethylurea | 44.0 |
| Wheat, medium standard (30–80 mesh) | 10,956.0 |
| Total weight | 11,000.0 |

ADDITIVES

|  | G. |
|---|---|
| Maize flour | 1,062.875 |
| Fat | 80.000 |
| Fishmeal, 60% protein | 100.000 |
| Soya bean meal, 50% protein | 500.000 |
| Gluten meal | 100.000 |
| Alfalfa meal, dried | 50.000 |
| Corn distiller solubles | 40.000 |
| Dicalcium phosphate | 28.000 |
| Calcium carbonate | 20.000 |
| Iodised salt | 10.000 |
| Vitamins A and D ($10^6$ units of A and $25 \cdot 10^4$ units of D/pound) | 4.000 |
| Calcium pantothenate | 0.250 |
| Butyloxytoluene | 0.250 |
| Choline chloride, 25% strength | 2.500 |
| Riboflavin (24 g./pound) | 0.125 |
| Vitamin $B_{12}$ (0.02 g./pound) | 1.000 |
| Methionine | 0.500 |
| Manganese sulphate | 0.500 |
| Total weight | 2,000.000 |

The additives are mixed as follows:

About half the maize meal is introduced into a mixing machine, the remainder thereof, mixed with the warmed liquified fat, is added and the whole is mixed until the fat is uniformly distributed. Thereafter manganese sulphate, dicalcium phosphate, calcium carbonate and iodised salt is added, and during the mixing the fishmeal, soya bean meal, gluten meal and alfalfa meal and the corn distiller solubles are further added. After thorough mixing, vitamins A and D, calcium pantothenate, choline chloride, riboflavin, vitamin $B_{12}$, methionine and butyl-oxytoluene are added, in this sequence, and mixing is continued until all constituents have been uniformly distributed. When this is reached, the well-mixed main constituents are added in such amount as to achieve a concentration of 50 g. of active compound per ton of feedstuff composition, uniformly distributed.

Example 3

Chicken feedstuff is manufactured with the following composition:

N - [2 - (5-nitrofurfurylidenemethyl)-6-quinolyl]-N'-monomethylurea _____ g__ 10–50

|  | Kg. |
|---|---|
| Maize | 267 |
| Wheat | 212 |
| Barley | 182 |
| Soya bean meal, 8.58% protein | 195 |
| Corngluten meal | 15 |
| Fish meal, 5.04% protein | 72 |
| Soya bean oil | 20 |
| Dicalcium phosphate | 14 |
| Calcium carbonate | 13 |
| Iodized salt | 4 |
| d,l-Methionine | 1 |
| Premix No. CRA P-1 | 5 |
|  | 1000 |

The premix No. CRA P-1 consists of 2,400,000 IU of vitamin A, 240,000 IU of vitamin $D_3$, 6,000 IU of vitamin E, 0.5 g. of vitamin K, 2.4 mg. of vitamin $B_{12}$, 10 g. of niacin, 3 g. of calcium pantothenate, 0.5 g. of vitamin $B_1$, 1.2 g. of vitamin $B_2$, 1.1 g. of vitamin $B_6$, 240 g. of cholin chloride, 0.2 g. of folic acid, 40 g. of Santoquin as well as amounts of the following ions: 1 g. Cu, 10 g. Fe, 10 g. Zn, 10 g. Mn, 0.2 g. I, 0.05 g. Co.

Example 4

Poultry battery growth test.—The effect on weight gain and general health status of chicks under normal clean conditions were tested using N-[2-(5-nitrofurfurylidene-methyl)-6-quinolyl]-N'-monomethylurea (compound No. 1) as active ingredient (added to the standard broiler diet according to Example 3) in comparison with 2-(5-nitrofurfurylidenemethyl) - 6 - aminoquinoline (compd. A), known from Brit. patent specific. No. 1,035,464.

Test procedure.—One day old chicks are used for the test. 4 replicate groups of 10 male chicks and 4 replicate groups of 10 female chicks per treatment are distributed at random to the battery cages (Petersime batteries containing 24 pens—6 levels at 4 pens, one heating unit per level). Also 2 x 4 replicate groups are used for the untreated control.

The chick groups are weighed and put consecutively into the battery pens. Feeders and waterers are previously prepared in the appropriate manner (feeders about 50% filled, waterers filled up to the border). For the first two days, about 100 g. of the above-mentioned feed per pen containing 50 p.p.m. of active ingredient are offered in 20 cm. wide plastic dishes to facilitate feeding. Each pen has to be mustered immediately after putting in the birds to make sure that the birds are feeding and drinking water. Temperature is adjusted daily to the optimal values as indicated on the thermometers placed on each deck of the batteries.

Group weight determinations are carried out at the starting day and after 28 days (=end of the experiment). Calculations: mean chick startweight, mean chick in weight, mean weight gain per bird.

Test result.—The use of Compound No. 1 resulted in a weight gain of the treated chicks of 9.6%, whilst the use of compound A resulted in a 8.1% weight gain (mean values) over the untreated control group. Compound No. 1 did not cause any visible side effect at any of the 80 chicks treated with it.

We claim:

1. A compound of the formula

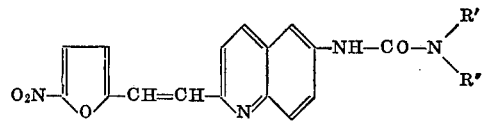

in which R' and R" may be the same or different and each represents a hydrogen atom or an alkyl radical with up to 12 carbon atoms, preferably a lower alkyl radical with 1 to 5 carbon atoms, a chloroalkyl radical with 1 to 3 carbon atoms or an alkenyl radical with 2 to 4 carbon atoms.

2. A compound according to claim 1 in which R' and R" may be the same or different each of them representing a hydrogen atom or a radical selected from the group consisting of methyl, ethyl, n-propyl, isopropyl, n-butyl, isobutyl, sec.-butyl, tert.-butyl, amyl, octyl, dodecyl, β-chloroethyl, allyl, methallyl and methylpropenyl.

3. The compound N-[2-(5-nitrofurfurylidene-methyl)-6-quinolyl]-N'-monomethylurea according to claim 2.

4. The compound N-[2-(5-nitrofurfurylidene-methyl)-6-quinolyl]-N'-monoethylurea according to claim 2.

References Cited

UNITED STATES PATENTS 3,352,683  11/1967  Schmidt et al. ____ 260—240 A
3,488,728  1/1970  Wilhelm et al. ____ 260—240 A

OTHER REFERENCES

Miura et al., Chem. Pharm. Bull., vol. 13, pp. 525 to 528 (1965).

Ujiie, Chem. Pharm. Bull., vol. 14, pp. 461–466 (1966).

JOHN D. RANDOLPH, Primary Examiner

U.S. Cl. X.R.

99—2 G, 4; 424—258; 260—240 E